(12) United States Patent
Perko et al.

(10) Patent No.: US 10,684,648 B2
(45) Date of Patent: *Jun. 16, 2020

(54) ELECTRONIC DISPLAY SUITABLE FOR SUBMERSION

(71) Applicant: Suunto Oy, Vantaa (FI)

(72) Inventors: Panu Perko, Vantaa (FI); Mikko Sepänniitty, Helsinki (FI); Tapio Savolainen, Helsinki (FI)

(73) Assignee: Suunto Oy, Vantaa (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,713

(22) Filed: May 28, 2018

(65) Prior Publication Data

US 2018/0275721 A1    Sep. 27, 2018

Related U.S. Application Data

(63) Continuation of application No. 14/022,259, filed on Sep. 10, 2013, now Pat. No. 9,990,000.

(30) Foreign Application Priority Data

Sep. 10, 2013 (FI) ...................................... 20135910

(51) Int. Cl.
*G06F 1/16* (2006.01)
*G04G 17/04* (2006.01)

(52) U.S. Cl.
CPC ......... *G06F 1/1637* (2013.01); *G04G 17/045* (2013.01)

(58) Field of Classification Search
CPC ........... G02F 1/133308; G02F 1/13338; G02F 1/1339; G02F 2001/133311; G02F 1/1637;
(Continued)

(56) References Cited

U.S. PATENT DOCUMENTS

| 3,789,606 A | * | 2/1974 | Isono | ...................... G04B 39/02 |
| | | | | 368/291 |
| 4,281,406 A | * | 7/1981 | Tanaka | ................... G04G 17/00 |
| | | | | 368/300 |

(Continued)

FOREIGN PATENT DOCUMENTS

| CH | 653844 A5 | 1/1986 |
| GB | 1411840 A | 10/1975 |

(Continued)

*Primary Examiner* — Adrian S Wilson
(74) *Attorney, Agent, or Firm* — Laine IP Oy

(57) ABSTRACT

There is disclosed herein a water tight submersible electronic device, such as a dive computer or a dive watch, comprising a case, a bezel, and glass through which a display can be viewed. The glass, case and bezel can all be different materials. The bezel is affixed to the case, in a permanent or removable manner, and has an opening for the glass and an electronic display. The electronic display is positioned under the glass and within the electronic device. For example, the glass is separated from and locked to the bezel by at least a locking ring, a shock absorber and/or a gasket. As such the glass can be free floating so that it and the bezel can deform under pressure without being damaged or causing damage to each other while maintaining a water tight connection.

25 Claims, 3 Drawing Sheets

(58) Field of Classification Search
CPC .......... G02F 1/1656; G02F 2200/1633; G04G 17/00; G04G 17/045; G04G 21/08
See application file for complete search history.

(56) References Cited

U.S. PATENT DOCUMENTS

| | | | | |
|---|---|---|---|---|
| 4,558,957 A * | 12/1985 | Mock | .................. | B29C 65/08 156/196 |
| 5,002,184 A * | 3/1991 | Lloyd | .................... | A45C 11/24 206/305 |
| 5,548,306 A * | 8/1996 | Yates, IV | ................ | G06F 3/044 345/174 |
| 5,659,376 A * | 8/1997 | Uehara | ............ | G02F 1/133308 348/794 |
| 5,808,707 A * | 9/1998 | Niibori | ............. | G02F 1/133308 349/150 |
| 5,946,501 A * | 8/1999 | Hayakawa | .......... | G03B 17/08 396/25 |
| 6,064,453 A * | 5/2000 | Inubushi | ........... | G02F 1/133308 349/58 |
| 6,292,439 B1 * | 9/2001 | Akiba | ............... | G02F 1/133514 368/84 |
| 6,532,152 B1 * | 3/2003 | White | ............... | G02F 1/133308 312/223.1 |
| 6,597,865 B1 * | 7/2003 | Negishi | .................. | G03B 17/08 396/25 |
| 6,909,475 B2 * | 6/2005 | Kojima | ................. | G06F 1/1626 349/58 |
| 7,379,128 B2 * | 5/2008 | Tsubokura | .......... | G02F 1/13394 349/58 |
| 7,697,269 B2 * | 4/2010 | Yang | ........................ | B29C 66/54 361/679.01 |
| 7,724,317 B2 * | 5/2010 | Kim | .................. | G02F 1/133308 349/58 |
| 7,854,434 B2 * | 12/2010 | Heiman | ................. | F16J 15/121 277/628 |
| 8,199,488 B2 * | 6/2012 | Zou | .......................... | B32B 3/02 312/223.1 |
| 8,870,437 B2 * | 10/2014 | Yoshikawa | ....... | G02F 1/133608 349/58 |
| 2001/0010569 A1 * | 8/2001 | Jin | .................... | G02F 1/133308 349/58 |
| 2002/0175836 A1 * | 11/2002 | Roberts | ................. | G06F 3/0414 341/34 |
| 2004/0004680 A1 * | 1/2004 | Kim | ................... | G02F 1/133308 349/58 |
| 2004/0141101 A1 * | 7/2004 | Osu | ................... | G02F 1/133308 349/58 |
| 2006/0256667 A1 | 11/2006 | Wyssbrod | | |
| 2007/0236465 A1 * | 10/2007 | Chou | .................... | G06F 1/1601 345/173 |
| 2009/0009945 A1 * | 1/2009 | Johnson | ................ | G06F 1/1613 361/679.27 |
| 2009/0049773 A1 * | 2/2009 | Zadesky | ........... | B32B 17/10018 52/204.62 |
| 2010/0112964 A1 * | 5/2010 | Yi | ........................ | G04G 9/0064 455/90.3 |
| 2010/0265655 A1 | 10/2010 | Metzler et al. | | |
| 2011/0051348 A1 * | 3/2011 | Song | ................. | G02F 1/133308 361/679.26 |
| 2011/0157087 A1 * | 6/2011 | Kanehira | .............. | G06F 3/0414 345/174 |
| 2011/0235476 A1 | 9/2011 | Hiranuma | | |
| 2012/0118773 A1 * | 5/2012 | Rayner | ................. | G06F 1/1626 206/320 |
| 2012/0314354 A1 * | 12/2012 | Rayner | .................. | H01H 13/06 361/679.01 |
| 2013/0098546 A1 * | 4/2013 | Racine | ................ | G04G 17/045 156/272.8 |
| 2013/0214656 A1 * | 8/2013 | Huang | .................. | H05K 5/061 312/223.1 |
| 2014/0340599 A1 * | 11/2014 | Rawer | .................. | B60K 35/00 349/12 |
| 2014/0368995 A1 * | 12/2014 | Lin | ....................... | G06F 1/1626 361/679.55 |

FOREIGN PATENT DOCUMENTS

| | | |
|---|---|---|
| GB | 1412708 | 11/1975 |
| JP | S5578276 A | 6/1980 |
| WO | WO2012035021 A1 | 3/2012 |

* cited by examiner

ELECTRONIC DISPLAY SUITABLE FOR SUBMERSION

FILED OF THE INVENTION

The present invention relates to a water tight submersible electronic device. More particularly, the present invention relates to a submersible electronic device having an electronic display behind a transparent medium such as glass. An example of such a device is a dive computer.

BACKGROUND OF THE INVENTION

Dive watches, dive computers and other submersible electronic devices are subjected to huge pressures and pressure changes during submersion. As different materials react and deform differently under the same pressure it is challenging to mix materials in such devices. With typical construction methods it can be necessary to sacrifice one desired material for another so that all of the materials of the device will perform well together when subjected to large pressures.

With the advancement in certain materials, such as advanced glasses which can be used for enhanced display and with touch sensitive devices, it is desirable to be able to incorporate them in to any design for such uses. Therefore, there exists a need to be able to isolate different materials having incompatible reactions and deformations to high pressure environments. Additionally, there exists the need to be able to assemble such a device in a simple and effective manner without degrading the usability of the device.

SUMMARY OF THE INVENTION

It is an object of the present invention to provide a water tight submersible electronic device.

It is an aspect of certain embodiments of the present invention to provide such a device having a case, a bezel, a transparent material such as glass housed within the bezel, and an electronic display viewable through said transparent material.

According to certain embodiments, the transparent material is separated from and locked to the bezel by at least a locking ring surrounding the perimeter of the glass. The locking ring can be capable of absorbing the different deformations of the transparent material and the material of the bezel under pressure while maintaining a water tight connection between the two. Additional components, such as a gasket and/or shock absorbent material can be used to completely isolate the transparent material from the bezel. As such, the transparent material can be locked in place water tightly with the bezel yet still be free floating. The locking ring may also not be a sealing element and as such may mainly hold the transparent material in a desired position. Furthermore, the locking ring may primarily be for allow and/or control the movement of the transparent material when the transparent material and device are under pressure.

Additionally, according to certain embodiments, to further isolate the transparent material from other portions of the device as well as to provide the optimal viewing results, an electronic display can be mounted to the transparent material with an optically clear adhesive. Furthermore, the mounted electronic display can be flexibly electronically coupled to other components within the device such that deformations of the transparent material and/or electronic display would not impact other components within the device, and vice versa.

DETAILED DESCRIPTION OF EXEMPLARY EMBODIMENTS

Figure 1:
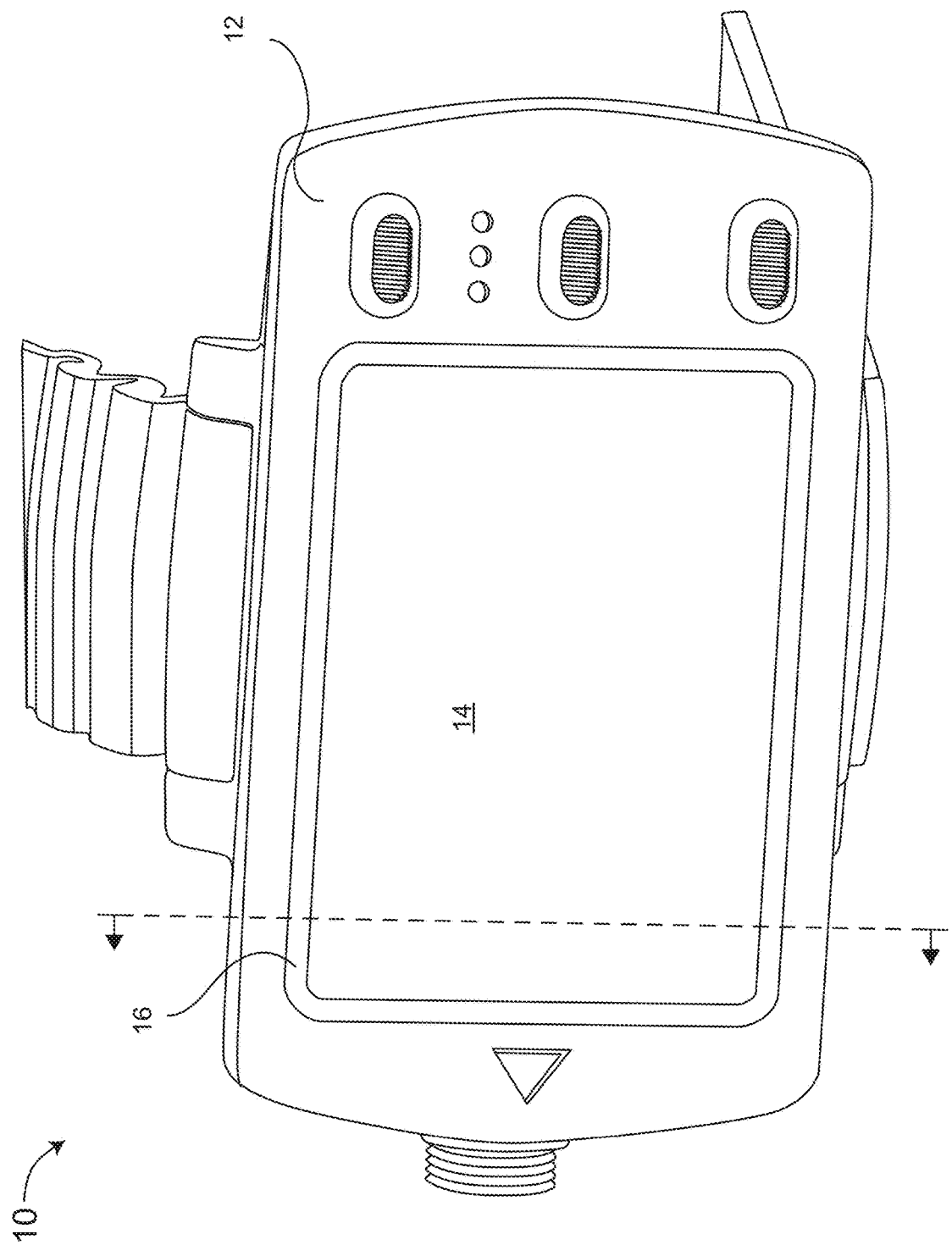
FIG. 1 shows an example of a dive computer in accordance with an embodiment of the present invention.

The present invention relates to water tight submersible electronic devices. An exemplary example of such is shown in FIG. 1. FIG. 1 shows an example of a dive computer which is capable of being submerged into seawater.

When submerging, the pressure exerted by water compounds the deeper you go and must be taken in to account in the design of products. One problem faced is that different materials react to the same pressure in different manners. This becomes particularly evident when dealing with glass and transparent mediums around or in contact with metal and plastic components. Therefore, there exists a need to isolate components having different material properties from each other while maintaining a water tight device under varying pressure conditions.

Therefore, there is disclosed herein a water tight submersible electronic device 10 comprising a case 18, a bezel 12, and glass 14 through which a display 20 can be viewed. The glass 14 can be, for example a lithium alumino-silicate glass. While the term glass is used here, the glass 14 can be any other suitable transparent medium. The bezel 12 can be metallic, for example a stainless steel, or other suitable material. The case 18 can be, for example, plastic and/or metallic.

The bezel 12 is affixed to the case 18, in a permanent or removable manner, and has an opening for the glass 14 and an electronic display 20. The electronic display 20 is positioned under the glass 14 and within the electronic device 10.

Figure 2:
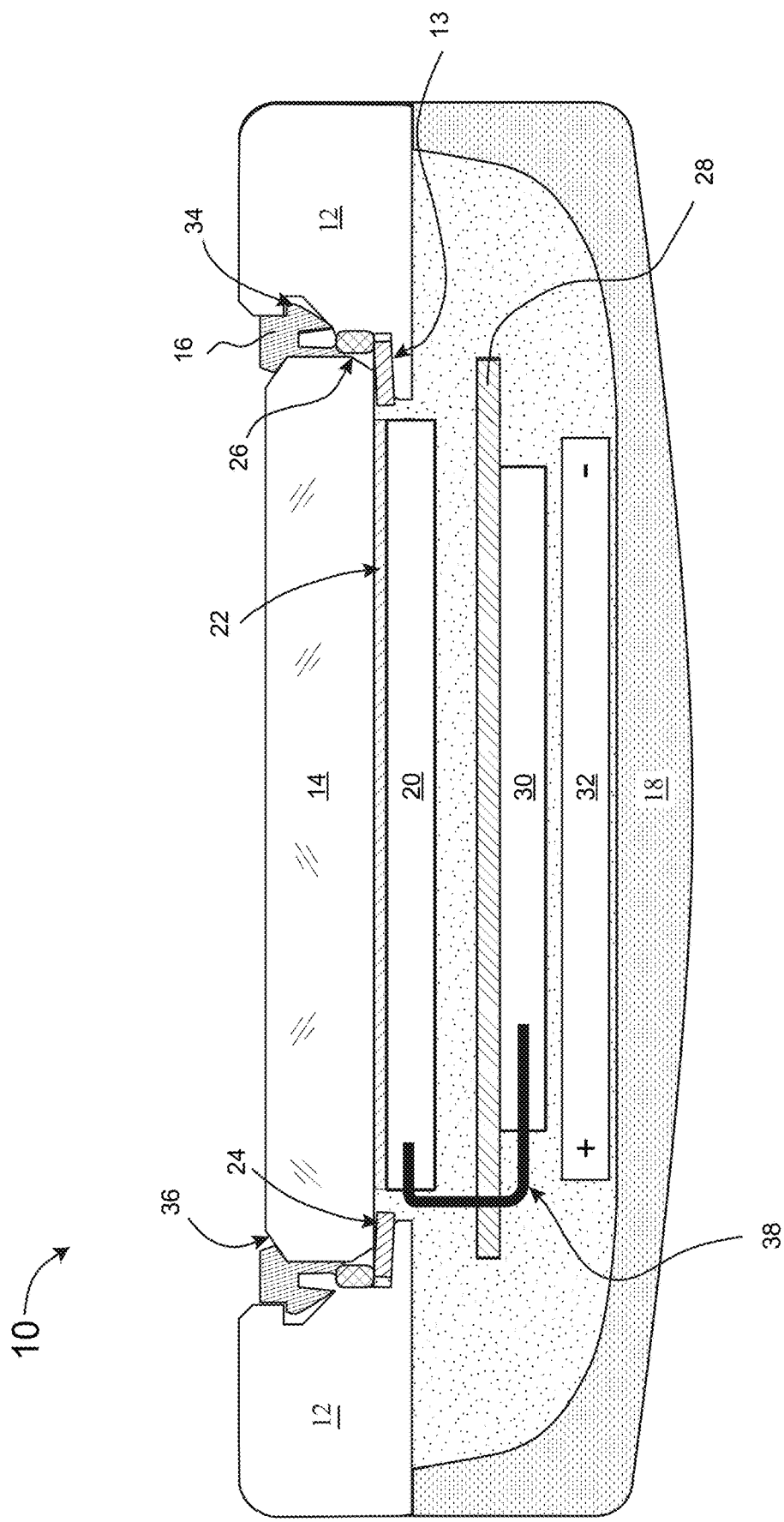
FIG. 2 shows a cutaway of the device of FIG. 1.

FIG. 2 shows a cutaway of the electronic device 10. As can be seen in FIG. 2, the electronic display 20 is mounted on the surface of the glass 14 within the device. The display is mounted with an optically clear adhesive (OCA) 22. An example of a suitable optically clear adhesive is 3M™ Contrast Enhancement Film. Additionally, as can be seen in FIG. 2, the glass 14 is separated from and locked to the bezel 12. This is achieved at least in part by the locking ring 16. Locking ring 16 surrounds the perimeter of the glass 14.

According to certain examples, the bezel 12, comprises a first opening, as would be viewed from the top or outside of the device looking in, which has dimensions larger than those of the glass 14. Additionally, the interior walls within the first opening, as seen in FIG. 2, have a height greater than or equal to the thickness of the glass 14. Therefore, the glass can be fully housed within the first opening of the bezel 12 without necessarily coming in contact with any portion of the bezel 12 itself.

Furthermore, according to certain of such examples, the opening in the bezel 12 further comprises a second opening, as would be viewed through the first opening from the top or outside of the device looking in, having dimensions smaller than those of the glass 14. The combination of the first and second openings forms a lip 13 of the bezel 12. This lip 13 can directly, or preferably indirectly, at least partially support the glass 14 within the first opening.

As can be seen in FIG. 2, the glass 14 can be completely isolated from the bezel 12. The glass 14, while being at least partially supported by the lip 13 of the bezel 12 is separated from said lip 13 by a shock absorber 24. The shock absorber 24 can be a material with shock absorbent properties such as a silicone. According to certain examples, a criteria of the shock absorber 24 is to have as hard a silicone as possible in order to decrease excess movement of the glass while still allowing for deformations due to pressure changes in water. In addition to the shock absorber 24 and the locking ring 16, there can also be a gasket 26 between the glass 14 and the bezel 12. An example of a suitable gasket material would be nitrile rubber. The gasket 26 can act as a sealing element between the bezel 12 and the glass 14. The gasket 26 is placed under the locking ring 16 which protects the gasket 26 from damage from outside the device.

One particular benefit of the present apparatus is improved shock resistance, e.g. dynamic mechanical shock against the glass 14, as well as improved hydrostatic pressure resistance. The shock absorber 16 improves both the hydrostatic pressure resistance and the shock resistance of the glass 14 especially for example when the bezel 12 is comprised of a hard material. Shock resistance is an important property in particular for diving devices as well as a range of other consumer products which is aided by embodiments of the present invention.

The locking ring 16 surrounds the perimeter of the glass 14, and concurrently the perimeter of the opening of the bezel 12. The locking ring 16 both locks the glass in place with the bezel 12 as well as separates the glass 14 from the bezel 12. The locking ring 16 may be plastic, such as but not limited to polyester. The Youngs modulus of the material of the locking ring 16 can be between 1 GPa and 4 Gpa, preferably between 2 GPa and 3 GPa, more preferably about 3 GPa. If the Youngs modulus is too big, substantially more than 4 GPa for example, then assembly of the locking ring 16 requires a substantial amount of force and becomes difficult or impossible. If the Youngs modulus is too small, substantially below 1 GPa then the reliability of fastening to the glass may not be ideal.

Figure 3:
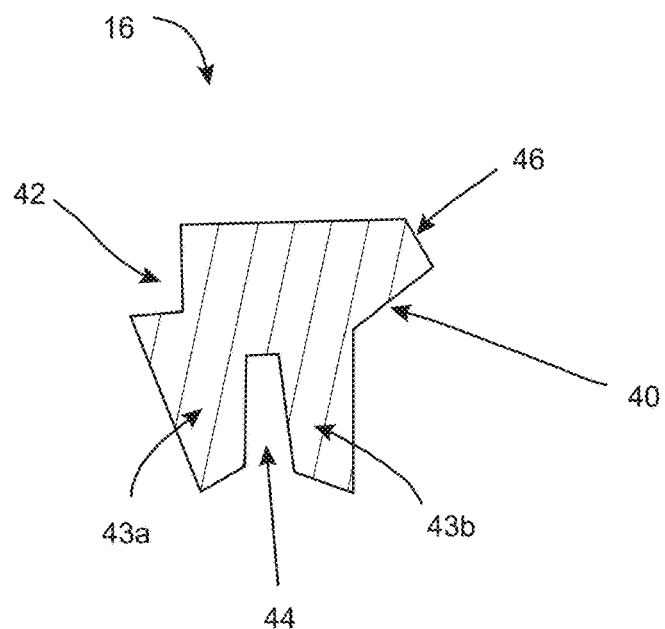
FIG. 3 shows an example cutaway geometry of a locking ring.

According to certain examples, as shown in FIGS. 2 and 3, the interior walls of the first opening of the bezel 12 may comprise a notch 34. The notch 34 may extend partially or entirely around the interior perimeter of the first opening of the bezel 12. The top of the notch may be horizontal or it may be inclined upwards towards the top of the bezel 12. The bottom of the notice may be similarly inclined or it may be flat as well. The purpose of the notch 34 is to receive a protrusion 42 of the locking ring 16. The notch 34 and protrusion 42 at least partially facilitate the locking of the glass 14 to the bezel 12. As seen in FIG. 2, the top surface of the glass 14 may comprise a bevel 36. Correspondingly, the portion 40 of the locking ring 16 which is in contact with the bevel 36 of the glass 14 may have a similar slope.

During assembly, the glass 14 can be arranged within the opening of the bezel 12 and then the locking ring 16 can be inserted between the glass 14 and the bezel 12 until the protrusion 42 of the locking ring 16 is within the notch 34 of the bezel 12. The assembly process can be aided by an optional gap 44 in a bottom portion of the locking ring 16 which forms two wall portions 43a and 43b which can be squeezed together when the locking ring 16 is being inserted. Additionally, the locking ring can essentially be inverted, such that the gap 44 is facing out when assembled. Such an arrangement may result in a more secure mounting of the glass 14 but may detract from the visual appearance as well as making servicing and disassembly more difficult. The dimensions of the wall portions 43a and 43b, e.g. their length or conversely the depth of the gap 44, can be selected to define the bending properties of the walls. Additionally, the walls 43a and 43b can be split, either partially or completely, in to portions to further define the bending properties of the walls. The bending properties of the walls can be selected, for instance, to have a desired ease of assembly. As described above, and as is herein referred to by free floating, the glass 14 can thus be flexibly separated at all points from and water tightly locked to the bezel 12. This flexible yet water tight separation allows for the different materials of the glass 14 and bezel 12 to coexist in one unit at depths which exert great pressure on the device 10. Additionally, to facilitate the separation of the materials, the glass 14 can be free floating within the opening of the bezel 12. As such, there can be no adhesive or sealant connecting the glass 14 to the locking ring 16, gasket 26, shock absorber 24 or combination thereof.

As can be seen in FIG. 2, the arrangement of the bezel 12, locking ring 16 and glass 14, along with their beveled edges, allows for a high degree of visibility of the display 20 from a wide range of viewing angles. The height gaps shown in FIG. 2 can be present or the bezel 12, locking ring 16 and glass 14 can be generally coplanar. Additionally, in order to achieve the best viewing of the electronic display 20 through the glass 14, the electronic display 20 should be bonded directly to the glass 14 as described above. However, if the electronic display 20 is bonded directly to the glass 14 and directly to another outer portion of the device then similar pressure deformation problems can be encountered. Therefore, the electronic display 20 can be flexibly connected to one or more electronic components 30 of the electronic device. As such, while the electronic display 20 is directly affixed to the glass 14 it is not directly affixed to any other component of the device 10 allowing the glass 14 to remain free floating from the bezel 12 and case 18 while at the same time allowing for optimal viewing of the display. Additionally, there can be a gap between the optically clear adhesive 22 and shock absorber 24 and lip 13 of the bezel 12, as shown in FIG. 2, to ensure that the glass 14 remains free floating.

As shown for example in FIG. 2, the electronic display 20 can be electrically connected to one or more electronic component(s) 30 by flexible electrical connectors 38. The electronic component(s) 30 can then be mounted on a printed circuit board 28 which can be supported within the casing of the electronic device 10. The casing may also comprise additional components, such as a battery 32.

Figure 4:
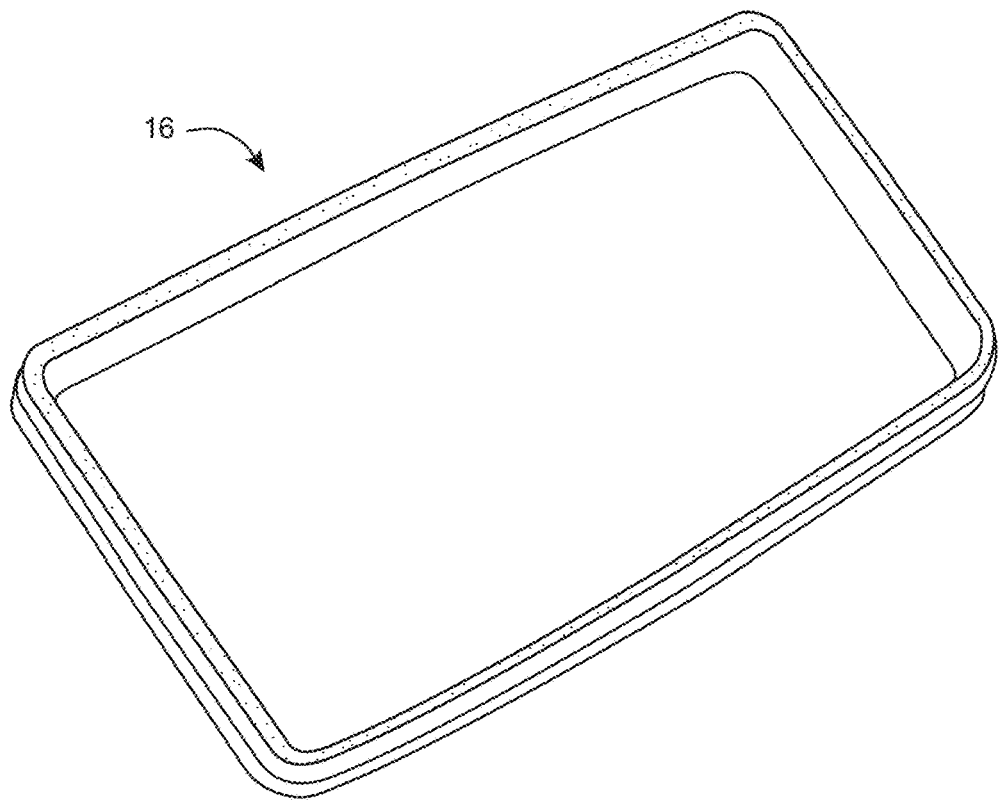
FIG. 4 shows an example of a locking ring.

FIG. 4 shows an example of the locking ring 16. The locking ring 16 can have a bevel 46 on the top as shown in FIG. 3. As seen in FIG. 2, the glass 14 can be slightly sunken in the opening of the bezel 12. The locking ring 16 may be at, above or below the level of the glass 14 or the bezel 12.

While certain embodiments and examples of the locking ring 16 have been discussed herein, one of ordinary skill in the art will recognize, based on the present disclosure, alternative compatible geometries of the locking ring 16 which do not depart from the scope of the present invention. Additionally, the locking ring 16 may further comprise one or more spring means which actively force the walls 43a and 43b apart when assembled.

The electronic display 20 can be, for example, a typical LED or LCD type display. The glass 14 and electronic display 20 may also form a touch sensitive display. Additionally, while the present examples have primarily been directed to a dive computer embodiment the disclosed construction can be applied to any type of device, particularly those with an intended submerged use.

The arrangements and apparatus described herein allow for an additional advantage of decreased thickness of display devices. For example, a locking ring 16 as described above, made of comparatively hard plastic material, allows for placement of a front surface of a piece of glass to be coplanar with a front surface of a bezel, even when the piece of glass is comparatively thin. Furthermore, a locking ring as described herein can be used with relatively thin glass having a small bevel, which is more cost effective to produce. Other embodiments include using a similar locking ring and a transparent material, e.g. polycarbonate or corresponding plastic, having a step in place of a bevel. Additionally, the use of OCA to attach a display to a piece of glass aids in the reduction of thickness in the device.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A water tight submersible electronic device comprising;
   a case,
   a bezel, having an opening for an electronic display, affixed to the case,
   an electronic display, positioned under a piece of glass, at least partially within the opening of the bezel, and
   at least one electronic component,
   wherein the display is attached to a surface of the glass within the device, and
   the glass is separated from and locked to the bezel by at least a locking ring surrounding the perimeter of the glass, the locking ring comprising a protrusion, and
   wherein the glass is free floating within the opening of the bezel and
   wherein the bezel comprises a notch,
   wherein the notch and the protrusion correspond and at least partially facilitate the locking of the glass to the bezel.

2. The device according to claim 1, wherein the locking ring extends below the glass.

3. The device according to claim 1, wherein the locking ring extends horizontally so that it overlaps a portion of the glass.

4. The device according to claim 1, wherein the opening in the bezel further comprises a second opening having dimensions smaller than those of the glass forming a lip which indirectly supports the glass within the first opening, the locking ring extending between the lip and the protrusion, and wherein the notch is comprised in a interior wall formed by the opening of the bezel and wherein the locking ring extends below the level of the glass.

5. The device according to claim 1, wherein the electronic display is not directly affixed to electronic components within the device.

6. The device according to claim 1, wherein the bezel is metallic.

7. The device according to claim 1, wherein the locking ring is plastic.

8. The device according to claim 1, wherein the display is a touch sensitive display.

9. The device according to claim 1, wherein the electronic display is mounted to the glass by an optically clear adhesive.

10. The device according to claim 9, wherein the optically clear adhesive completely supports the electronic display within the device, and wherein the electronic display is electrically connected to the at least one electronic component via a flexible electrical connection.

11. The device according to claim 1, wherein the at least one electronic component is not directly supported by the bezel.

12. The device according to claim 1, wherein at least a top surface of the glass is beveled and wherein a portion of the locking ring in contact with the bevel of the glass has a substantially similar slope.

13. A water tight submersible electronic device comprising;
   a case,
   a bezel, having an opening for an electronic display, affixed to the case,
   an electronic display, positioned under a piece of glass, at least partially within the opening of the bezel, and at least one electronic component, wherein the display is attached to a surface of the glass within the device, the glass is separated from and locked to the bezel by at least a locking ring surrounding the perimeter of the glass, and wherein the glass is free floating within the opening of the bezel, wherein the opening in the bezel comprises an opening and interior walls wherein the interior walls comprise a notch, the locking ring comprises a corresponding protrusion, and wherein the notch and protrusion at least partially facilitate the locking of the glass to the bezel.

14. The device according to claim 13, wherein the interior walls within the opening having a height greater than or equal to the thickness of the glass.

15. The device according to claim 13, wherein the opening in the bezel further comprises a second opening having dimensions smaller than those of the glass forming a lip which indirectly supports the glass within the first opening.

16. The device according to claim 13, wherein the electronic display is not directly affixed to electronic components within the device.

17. The device according to claim 13, wherein the bezel is metallic.

18. The device according to claim 13, wherein the locking ring is plastic.

19. The device according to claim 13, wherein the display is a touch sensitive display.

20. A water tight submersible electronic device comprising;
a case,
a bezel, having an opening for an electronic display, affixed to the case,
an electronic display, positioned under a piece of glass, at least partially within the opening of the bezel, and
at least one electronic component,
wherein the display is attached to a surface of the glass within the device, and
the glass is free floating and flexibly separated from and water tightly locked to the bezel by at least a locking ring surrounding the perimeter of the glass, the locking ring comprising a protrusion, and wherein the protrusion is at least partially retained by a notch of the bezel.

21. The device according to claim 20, wherein the locking ring extends below the glass.

22. The device according to claim 20, wherein the locking ring extends horizontally so that it overlaps a portion of the glass.

23. The device according to claim 20, wherein the opening in the bezel further comprises a second opening having dimensions smaller than those of the glass forming a lip which indirectly supports the glass within the first opening, the locking ring extending between the lip and the protrusion of the bezel.

24. The device according to claim 20, wherein the electronic display is not directly affixed to electronic components within the device.

25. The device according to claim 1, wherein the notch in the bezel is formed in a direction which is parallel to the glass.

* * * * *